United States Patent [19]
Chao

[11] Patent Number: 5,627,608
[45] Date of Patent: May 6, 1997

[54] SPECTACLE FRAME HAVING RESILIENT LEGS

[76] Inventor: Richard Chao, No. 43-4, Yi Hsin Tsuen, Shui San Hsiang, Chia Yi Hsien, Taiwan

[21] Appl. No.: 561,128

[22] Filed: Nov. 20, 1995

[51] Int. Cl.6 .............................. G02C 5/16; G02C 5/14; G02C 5/22
[52] U.S. Cl. .................... 351/113; 351/121; 351/153; 16/228
[58] Field of Search ................... 351/111, 113, 351/121, 114, 149, 153, 119; 16/228

[56] References Cited

U.S. PATENT DOCUMENTS

| | | | |
|---|---|---|---|
| 3,064,530 | 11/1962 | Vigano | 351/121 |
| 3,907,410 | 9/1975 | Richmond et al. | 351/119 |
| 4,456,346 | 6/1984 | Beyer | 351/113 |
| 5,416,537 | 5/1995 | Sadler | 351/47 |

*Primary Examiner*—Huy Mai
*Attorney, Agent, or Firm*—Peterson, Wicks, Nemer & Kamrath, PA

[57] ABSTRACT

A spectacle frame includes two extensions extended from the side portions and each having a pivot shaft and a channel. A pair of legs each has one end engaged through the channels and secured to the pivot shaft so as to allow the legs to be rotated about the pivot shafts. The legs each has a slide slidably engaged on the end end and each has a spring for biasing the slides to engage with the extensions. The springs may be easily engaged on the legs. No holes or cavities are required to be formed in the legs such that the strength of the legs will not be decreased.

3 Claims, 2 Drawing Sheets

SPECTACLE FRAME HAVING RESILIENT LEGS

BACKGROUND OF THE INVENTION

1. Field of the Invention

The present invention relates to a spectacle frame, and more particularly to a spectacle frame having resilient legs.

2. Description of the Prior Art

Typical spectacle frames comprise a spring action hinge for resiliently coupling the legs to the frame body. Two of the prior arts are disclosed in U.S. Pat. Nos. 4,747,183 to Drlik and 5,018,242 to Guy et al. In both of the prior arts, the spring action hinges may apply a resilient force to the legs. However, the legs each should be excavated with a cavity therein for engaging with the spring hinges of rather complicated configuration. The cavities may greatly reduce the strength of the legs. In addition, it will be difficult to engage so many parts or elements within the cavities of the legs which include a small size normally.

The present invention has arisen to mitigate and/or obviate the afore-described disadvantages of the conventional spectacle frames.

SUMMARY OF THE INVENTION

The primary objective of the present invention is to provide a spectacle frame which includes a pair of spring member engaged on the outer portion of the legs so as to allow the spring members to be easily engaged onto the legs of the spectacle frame.

In accordance with one aspect of the invention, there is provided a spectacle frame comprising a frame body for supporting lenses therein, the frame body including two side portions each having an extension extended therefrom, the extensions each including a free end having a pivot shaft rotatably secured therein and having a channel formed therein, and a pair of legs each including a first end portion engaged through the channels and secured to the pivot shaft so as to allow the legs to be rotated about the pivot shafts respectively, the legs each including a middle portion and each including a slide slidably engaged on the first end thereon and each including a spring member engaged thereon, the spring members being engaged on the legs respectively and each including a first end secured to the middle portion of the legs and each including a second end engaged with the slides for biasing the slides to engage with the free ends of the extensions.

The legs each includes a stop secured on the middle portions thereof for engaging with the spring members respectively and for positioning the spring members.

The free ends of the extensions each includes two recesses formed therein for engaging with the slides so as to maintain the legs in a first position substantially parallel to the frame body and in a second position substantially perpendicular to the frame body respectively.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
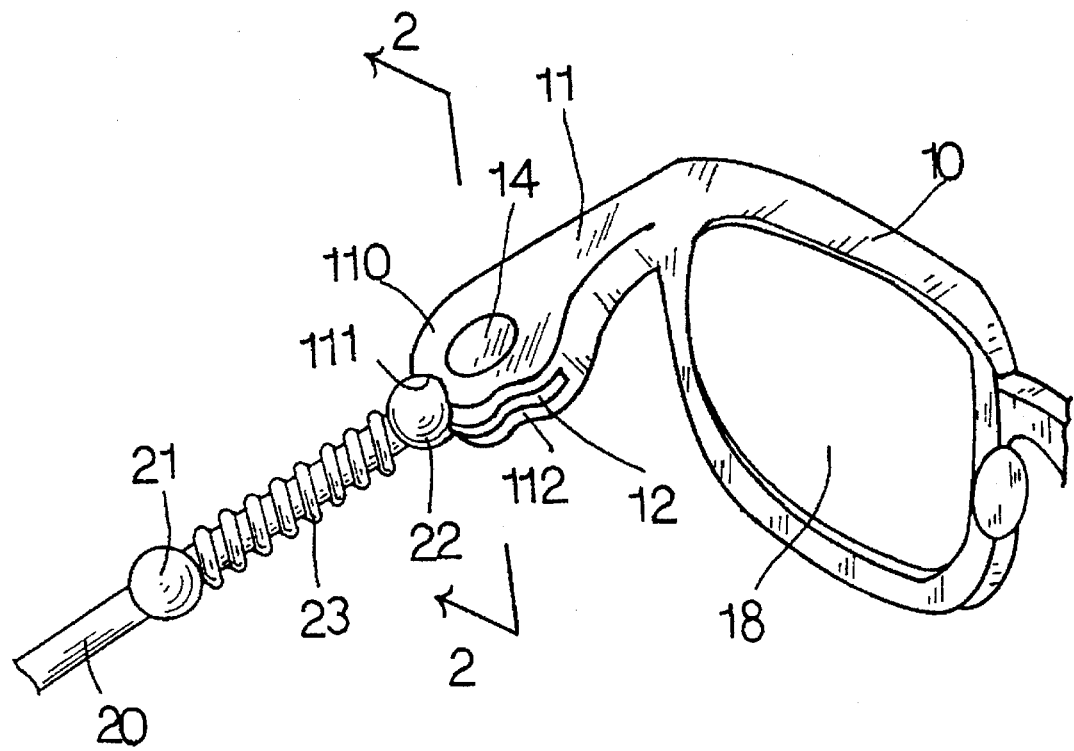
FIG. 1 is a partial perspective view of a spectacle frame in accordance with the present invention.
Figure 2:
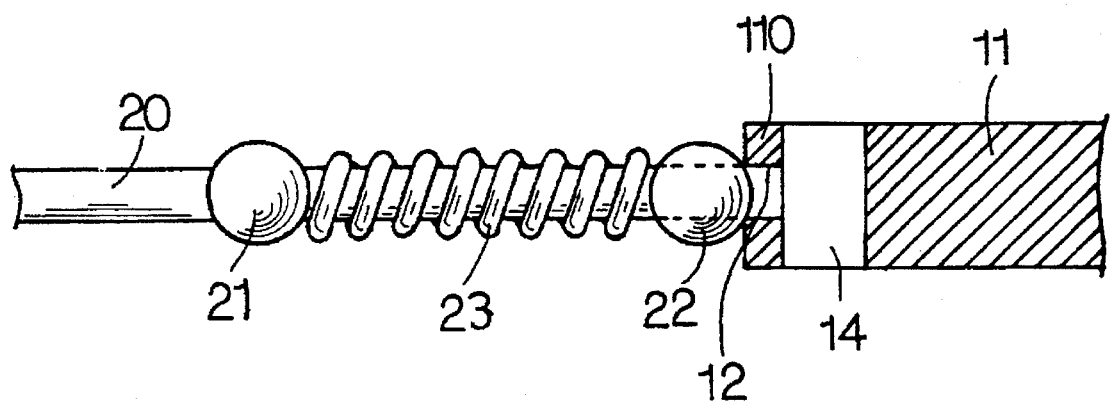
FIG. 2 is a cross sectional view taken along lines 2—2 of FIG. 1.
Figure 3:
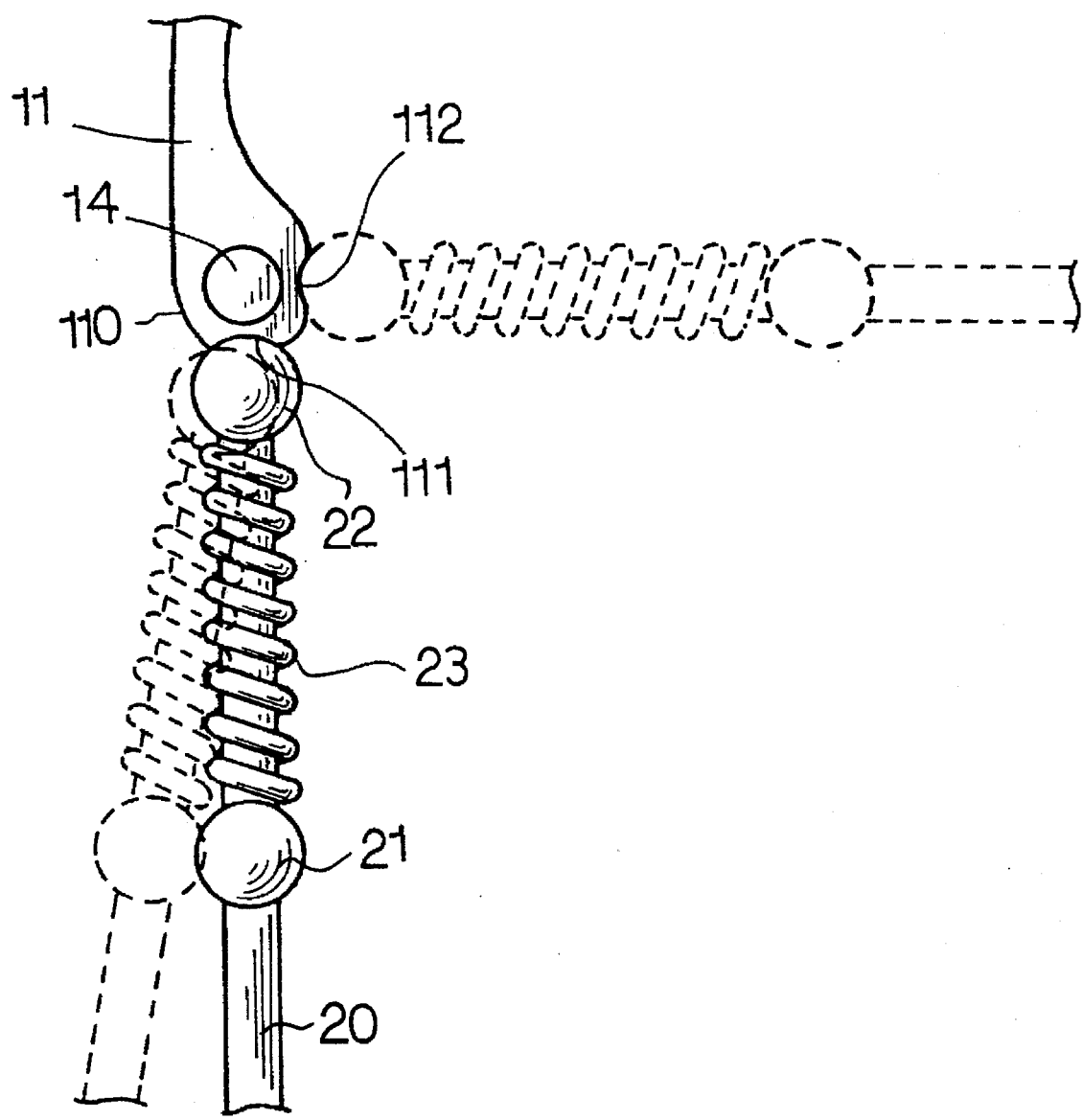
FIG. 3 is a schematic view illustrating the coupling of the legs to the spectacle frame.

Referring to the drawings, a spectacle frame in accordance with the present invention comprises a frame body 10 for supporting lenses 18 therein. The frame body 10 includes two side portions each having an extension 11 extended rearward therefrom. The extensions 11 each includes a free end 110 having a channel 12 formed therein and having a pivot shaft 14 rotatably secured therein. A pair of legs 20 each includes one end engaged through the respective channels 12 and secured to the respective pivot shafts 14 of the extensions 11 such that the legs 20 may be rotated about the pivot shafts 14 respectively. The legs 20 each includes a middle portion having a stop 21 secured thereon and each includes a slide 22 slidably engaged on the end portion thereof. A pair of spring members 23 are engaged on the end portions of the legs 20 and are biased between the stops 21 and the slides 22 for biasing the slides 22 to engage with the free end portions 110 of the extensions 11 The free end portions 110 of the extensions 11 each includes two recesses 111, 112 spaced at about 90 degrees for engaging with the slides 22 so as to maintain the legs at a position substantially perpendicular to the frame body 10 or at a position parallel to the extensions 11 respectively.

It is to be noted that no holes or cavities are required to be formed in the legs such that the strength of the legs will not be decreased. In addition, the springs 23 may be easily engaged onto the legs 20 such that the spectacle frame may be easily and quickly manufactured.

Accordingly, the spectacle frame in accordance with the present invention includes a pair of springs that may be easily engaged onto the legs. In addition, no holes or cavities are required to be formed in the legs such that the strength of the legs will not be decreased.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A spectacle frame comprising, in combination:

a frame body for supporting lenses therein, said frame body including at least one side portion, with each side portion having an extension extended therefrom, said extension including a free end having a pivot shaft rotatably secured therein and having a channel formed therein, and with each side portion further including a leg including a first end engaged through said channel and secured to said pivot shaft so as to allow said leg to be rotated about said pivot shaft, said leg further including a middle portion having an outer portion, a slide slideably engaged onto the outer portion and a spring member, said spring member being engaged onto the outer portion and including a first end secured to said middle portion of said leg and a second end engaged with said slide for biasing said slide on the outer portion to engage with said free end of said extension.

2. A spectacle frame according to claim 1, wherein said leg includes a stop secured onto the outer portion of said middle portion for engaging with said spring member and for positioning said spring member.

3. A spectacle frame according to claim 1, wherein said free end of said extension includes two recesses formed therein for engaging with said slide so as to maintain said leg in a first position substantially parallel to said frame body and in a second position substantially perpendicular to said frame body respectively.

* * * * *